US005490933A

United States Patent [19]
LaPack et al.

[11] Patent Number: 5,490,933
[45] Date of Patent: Feb. 13, 1996

[54] SELF-REGULATED BIOLOGICAL SCRUBBER AND/OR GAS STRIPPER FOR THE TREATMENT OF FLUID STREAMS

[75] Inventors: Mark A. LaPack; Terry J. Nestrick; William F. Martin; Gary M. Klecka, all of Midland, Mich.

[73] Assignee: The Dow Chemical Company, Midland, Mich.

[21] Appl. No.: 210,108

[22] Filed: Mar. 17, 1994

Related U.S. Application Data

[63] Continuation of Ser. No. 680,663, Apr. 4, 1991, abandoned.

[51] Int. Cl.$^6$ ................................. C02F 3/00; C02F 1/44
[52] U.S. Cl. .......................... 210/603; 210/614; 210/631; 210/638
[58] Field of Search ..................................... 210/603, 614, 210/620, 631, 750, 96.1, 680, 663, 638, 639, 645

[56] References Cited

U.S. PATENT DOCUMENTS

| | | | |
|---|---|---|---|
| 3,342,727 | 9/1967 | Bringle | 210/13 |
| 3,393,149 | 7/1968 | Conley et al. | 210/42 |
| 3,596,767 | 8/1971 | Antonie | 210/97 |
| 3,821,087 | 6/1974 | Knzek et al. | 195/127 |
| 4,099,871 | 7/1978 | Sunahara et al. | 210/143 |
| 4,130,481 | 12/1978 | Chase et al. | 210/614 |
| 4,159,248 | 6/1979 | Taylor et al. | 210/96.1 |
| 4,160,734 | 7/1979 | Taylor et al. | 210/96.1 |
| 4,280,910 | 7/1981 | Baumann | 210/614 |
| 4,341,633 | 7/1983 | Walder | 210/614 |
| 4,383,920 | 5/1983 | Muller et al. | 210/96.1 |
| 4,437,992 | 3/1984 | Saito et al. | 210/614 |
| 4,504,393 | 3/1985 | Davies | 210/614 |
| 4,510,243 | 4/1985 | Haga et al. | 435/167 |
| 4,690,755 | 9/1987 | Friedman et al. | 210/96.1 |
| 4,764,271 | 8/1988 | Acosta | 210/96.1 |
| 4,783,750 | 11/1988 | Smith | 210/614 |
| 4,898,672 | 2/1990 | Clifft et al. | 210/614 |
| 4,988,626 | 1/1991 | Ajot et al. | 436/148 |

OTHER PUBLICATIONS

D. M. Comberbach, J. M. Scharer, and M. Moo–Young, *Biotechnology Letters*, vol. 6, No. 2, pp. 91–96 (1984).
Abstract No. 91–01298: F. Valero, J. Lafuente; M. Poch; C. Sola, *Appl. Biochem. Biotechnol.* (1990) 24–25, 591–602.
Abstract No. 91–01282: H. P. Huang; L. L. Chang; Y. C. Chao, *Chem. Eng. Commun.* (1990) 94, 105–18.
E. Namkung and B. E. Rittmann, *Journal WFCF*, vol. 59, No. 7 (1987), pp. 670–678.
G. W. Albin and G. C. Holden, *Water Res.*, vol. 19, No. 3 (1985), pp. 363–371.
E. J. Bouwer and P. L. McCarty *Environ. Sci. Technol*, vol. 16 (1982), pp. 836–843.
R. L. Berglund and G. M. Whipple, *Chemical Engineering Progress*, (Nov. 1987), pp. 46–54.
S. A. Hannah, B. M. Austem, E. E. Eralp, and R. H. Wise, *Journal WPCF*, vol. 58, No. 1 (1986) pp. 27–34.
McGraw–Hill Book Company, *Wastewater Engineering: Treatment, Disposal, Reuse*, 2nd Edition, New York, NY (1979).

*Primary Examiner*—Thomas Wyse
*Attorney, Agent, or Firm*—Noreen D. Warrick; Timothy S. Stevens

[57] ABSTRACT

This invention relates to a self-regulated apparatus and method for extracting biodegradable and/or strippable constituents from a fluid stream by the action of biomass which consumes or degrades such substances or by gas stripping. Such self-regulation permits the monitoring and optimization of the bioactivity of the system and the overall degree of treatment of the fluid stream.

12 Claims, 7 Drawing Sheets

SELF-REGULATED BIOLOGICAL SCRUBBER AND/OR GAS STRIPPER FOR THE TREATMENT OF FLUID STREAMS

CROSS-REFERENCE TO RELATED APPLICATION

This is a continuation of application Ser. No. 07/680,663, filed Apr. 4, 1991, now abandoned.

BACKGROUND OF INVENTION

This invention relates to an apparatus and method for extracting biodegradable constituents from a fluid stream by the action of a cell culture, e.g., biomass which digests or assimilates such constituents. In particular, this invention relates to a biomass-based apparatus and method which incorporates a component to monitor and optimize the bioactivity of the system.

Often, it is desirable to remove biodegradable constituents, such as organic constituents and/or gaseous inorganic sulfur-containing or nitrogen-containing constituents, from a fluid stream. In particular, it is often desirable to remove such constituents from fluid process streams prior to their discharge or release.

Thermal oxidizers, incorporated into a vent stack, serve to oxidize organic components of a process stream principally to carbon dioxide and water. Such units require an input of energy, typically in the form of heat, to effect such oxidations. Such an input of energy greatly increases the operating costs of the system.

In contrast, biological systems are passive, i.e., they do not require an input of energy. Upon the passage of a stream containing a biodegradable constituent over a suitable biomass, the biomass consumes and/or degrades the constituent, producing a treated effluent stream. As the biomass is a living system, the maintenance of such factors as pH, temperature, oxygen concentration, carbon dioxide concentration, and nutrient concentration is essential if the biomass is to be sustained. Simple electrodes, probes, and sensors can provide basic information as to the condition of the process stream. Existing systems use the data collected from such instruments to estimate the bioactivity of the system, and the percent purification of the stream. Such estimations are generally made on the basis of samples taken from the process stream to a laboratory for analysis. Such analyses typically take at least thirty minutes per sample to complete. None of the systems known in the art make a real time, i.e., an on-line, measurement of the consumption of biodegradable constituents by the biomass. Such a real time measurement would be particularly advantageous in the control of biological systems to avoid system upsets. Results obtained at times much later than the time of sampling may be too late to prevent deleterious effects on the biomass.

Waste fluid streams often contain more than one constituent to be removed. Such streams also typically contain particulate matter. No known system permits the on-line determination of the amount of a biodegradable constituent removed from a dirty, complex process stream.

Prior activities in the relevant art have focused on the analysis of effluent gas or liquid streams, following the treatment thereof in a reactor. The concept of the on-line analysis of both the influent and effluent streams has not previously been reported. For complete and accurate characterization of a process, it would be preferable to analyze all streams, both influent and effluent, to avoid or minimize errors made from assumptions about the content of the influent streams. This is particularly true in waste water treatment applications, where the influent stream may represent a combination of the discharge streams from a multitude of manufacturing operations.

A biological system for the treatment of fluid streams which utilizes a means for directly measuring the consumption of biodegradable constituents by the biomass would hold significant advantages for industry. The envisioned system would permit the facile analysis of dirty, complex process streams. Further advantages would be realized in a system which utilizes an on-line means for monitoring the concentration and identity of constituents within the aqueous bath for the biomass. Such a system would enhance the detection of anomalies and dead spots within the system, and would improve the monitoring of the health of the biomass. Such a system would further enable the realization of a steady state or equilibrium, which translates to decreased, if not negligible, productions of biosludge.

SUMMARY OF INVENTION

Accordingly, this invention provides a biomass-based method and apparatus which utilize a self-regulation component to monitor and optimize the bioactivity of the system.

The inventive method comprises:

(a) introducing into a treatment zone at a first volumetric flow rate a liquid or gaseous influent stream containing at least one constituent which may be reduced in concentration by a treatment selected from the group consisting of gas stripping and biodegradation, the influent stream being characterized by a first mass flow rate of each of the constituents introduced;

(b) treating the influent stream in the treatment zone by either biodegrading with an effective biomass or gas stripping;

(c) discharging from the treatment zone a liquid or gaseous effluent stream at a second volumetric flow rate, the effluent stream being characterized by a second mass flow rate of each of the constituents or by-products thereof;

(d) making an on-line determination of the first mass flow rate of at least one constituent and the second mass flow rate of the constituent or a by-product thereof; and (e) adjusting at least one of either the first mass flow rate or the second mass flow rate in response to the determination of step (d).

one embodiment, the apparatus comprises:

(a) a closed vessel containing a treatment zone, the treatment zone being adapted to serve as a bioreactor or as a gas stripper and being suitable to reduce the concentration of at least one constituent contained in an influent liquid or gaseous stream;

(b) means for introducing the influent stream into the treatment zone, the influent stream being characterized by a first mass flow rate of each of the constituents introduced;

(e) means for discharging from the treatment zone a liquid or gaseous effluent stream, the effluent stream being characterized by a second mass flow rate of each of the constituents or by-products thereof;

(d) on-line monitoring means for determining a first mass flow rate for at least one constituent and a second mass flow rate for the constituent or a by-product thereof; and (e) means for adjusting at least one of either the first mass flow rate or the second mass flow rate in response to the mass flow rates determined by the on-line monitoring means.

BRIEF DESCRIPTION OF THE DRAWINGS

These and other embodiments receive further discussion in the following detailed description wherein.

DETAILED DESCRIPTION

Figure 1:
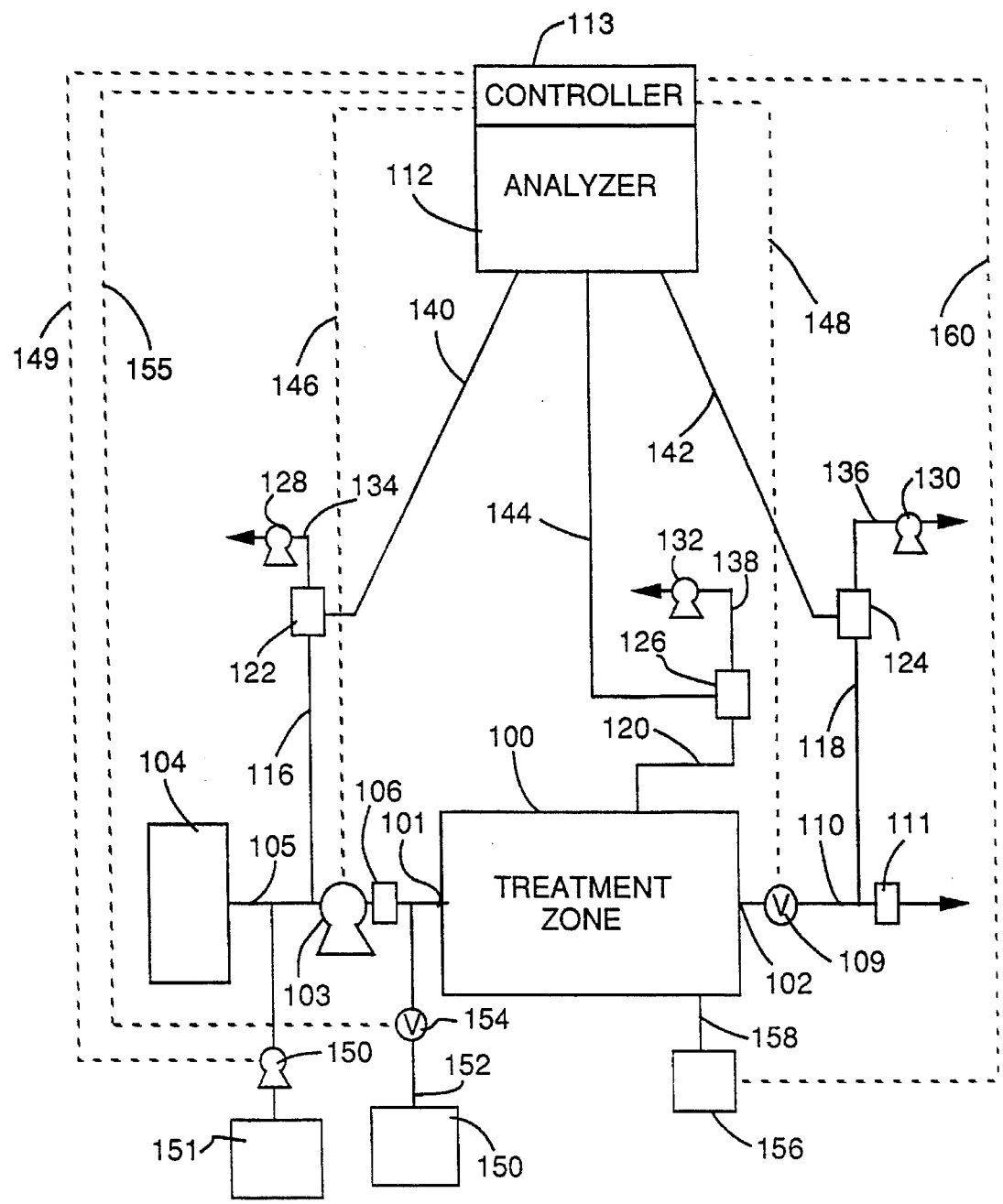
FIG. 1 is a flow diagram of an apparatus and a process of this invention for the in situ treatment of a fluid stream containing at least one biodegradable constituent.

Mass balance determinations permit the characterization of a process by the continuous analysis of the process influent and effluent streams. For a given biodegradable constituent entering a biodegradation process, the steady state mass balance equation is:

$$M_{FI} = M_{FE} + M_P$$

wherein $M_{FI}$, is the mass flow rate of the constituent in the influent stream, $M_{FE}$ is the mass flow rate of the constituent in the effluent stream, and $M_P$ is the mass flow rate due to the uptake of the constituent by the process. In such a biodegradation process $M_P$ represents the sum of the mass flow rate of the constituent solubilized in the biomass-containing aqueous solution and the mass flow rate due to the biouptake of the constituent. The values for $M_{FI}$, and $M_{FE}$ may be determined from the on-line analysis of the relevant streams, with $M_P$ being calculated therefrom. The on-line analysis comprises sampling the streams and/or extracts therefrom, rich in the biodegradable constituents, to an analytical device which generates a response proportional to the mass flow rate of the constituent in the streams. The mass flow rate of the constituent in the streams may be calculated from the responses through the use of a standard, as is known in the art.

For the most accurate results, $M_{FE}$ should be determined at a time later than the determination of $M_{FI}$, the time lapse equaling the residence time of the constituent in the bioreactor. In cases where the biomass consumes the constituent nearly instantaneously, the preferred method will make nearly instantaneous analyses of the influent and effluent streams, with the analysis of the former proceeding that of the latter. Likewise, the determinations will preferably be made only after the system has achieved steady state conditions.

For a given strippable constituent entering a stripping process, the steady state mass balance equation is:

$$M_{FI} + M_{SI} = M_{FE} + M_{SE}$$

wherein $M_{FI}$ is the mass flow rate of the constituent in the influent liquid stream, $M_{SI}$ is the mass flow rate of the constituent in the influent gas stripping stream, $M_{FE}$ is the mass flow rate of the constituent in the effluent liquid stream, and $M_{SE}$ is the mass flow rate of the constituent in the effluent gas stripping stream. The values for $M_{FI}$, $M_{SI}$, $M_{FE}$, and $M_{SE}$ may be determined from the on-line analysis of the relevant streams.

Preferably, and for the most accurate results, $M_{SE}$ and $M_{FE}$ should be determined at a time later than the determination of $M_{FI}$ and $M_{SI}$, the time lapse equaling the residence time of the constituent in the bioreactor. Likewise, the determinations will preferably be made only after the system has achieved steady state conditions.

The textbook *Wastewater Engineering: Treatment, Disposal, Reuse*, 2nd Edition, McGraw-Hill Book Company, New York (1979), at pages 735–739, herein incorporated by reference, provides a steady-state materials balance equation for a stripping tower.

Figure 5:
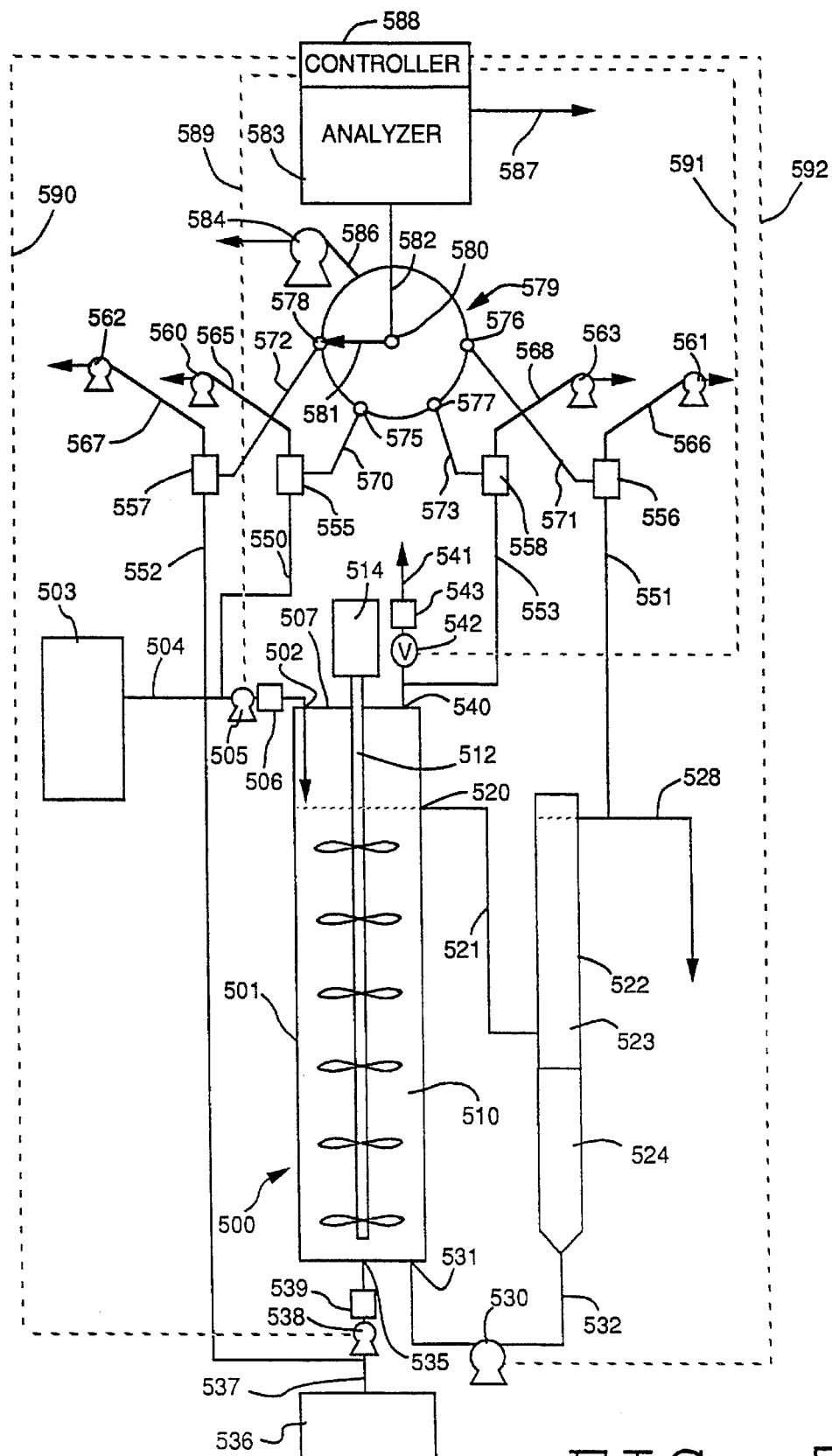
FIG. 5 is a schematic diagram of a self-regulated stirred biological and gas stripping reactor of this invention.

For combined biodegradation and gas stripping treatments, such as set forth in FIG. 5, the mass balance equation for a given constituent is:

$$M_{FI} + M_{SI} = M_{FE} + M_{SE} + M_P$$

with $M_{FI}$, $M_{FE}$, and $M_P$ being as defined above, and with $M_{SI}$ and $M_{SE}$ being the mass flow rates of the constituent in the influent and effluent stripping streams, respectively. The values for $M_{FI}$, $M_{SI}$, $M_{FE}$, and $M_{SE}$ may be determined from the on-line analysis of the relevant streams, with $M_P$ being calculated therefrom.

Preferably, and for the most accurate results, $M_{FE}$ and $M_{SE}$ should be determined at a time later than the determination of $M_{FI}$ and $M_{SI}$, the time lapse equaling the sum of the residence times of the constituent in the bioreactor and gas stripper. Likewise, the determinations will preferably be made only after the system has achieved steady state conditions.

For a solution containing a measurable constituent, the mass flow rate of the constituent equals the product of the concentration (mass/volume) of the solution with respect to the constituent and the flow rate (volume/unit time) of the solution at the time of sampling. A mass spectrometer produces a distinct signal for each measurable constituent of an analyte. Such signals may be correlated to the concentration of each constituent in the analyte by the use of a standard calibration solution of the constituent, as is known in the art.

Often, it will be preferred to extract a portion of the constituent from the stream to be analyzed, through the use of a membrane selectively permeable to the constituent. The permeate, concentrated with respect to the constituent, is analyzed by the analyzer. The signal generated from the permeate may be correlated to the mass flow rate of the constituent in the relevant stream by the use of a standard calibration technique.

Often, the biomass will partially degrade a constituent, producing a by-product, which is discharged in an effluent stream. In some embodiments of the invention, the effluent stream may be analyzed with respect to a by-product of a constituent, rather than with respect to the constituent itself.

In such cases, a mole balance, rather than a mass balance, should be performed. The mole flow rate of the by-product may be calculated by dividing the mass flow rate of the by-product by its gram molecular weight. Likewise, the mole flow rate of the constituent, i.e., in the influent stream, may be calculated by dividing the mass flow rate of the constituent by its gram molecular weight. The efficiency of the process may be determined by comparing the mole flow rate of the by-product in the effluent stream to the mole flow rate of the constituent in the influent stream, with an efficient process being one consistent with the reaction stoichiometry.

The following FIGS. 1 through 7 are described assuming none of $M_{FI}$, $M_{SI}$, $M_{FE}$, and $M_{SE}$ are known. In actuality, one or more of these may be known, i.e., if a standard solution is used. For instance, in many cases, $M_{SI}$ will be zero, reflecting the absence of the constituent in question from the influent stripping stream. Should the mass flow rate of a constituent within a given stream be known, such a stream need not be fed to the analyzer. The known mass flow rate may merely be provided to the analyzer and/or controller as a constant.

Each of the FIGS. 1 through 7 illustrates various constructions of the fluid treatment zones, and select methods of stream sampling.

FIG. 1

The flow diagram of FIG. 1 illustrates the self-regulated treatment of fluid streams to remove at least one biodegradable constituent therefrom. The apparatus comprises: a treatment zone 100 having an influent stream inlet 101 and an effluent outlet 102, a variable speed pump 103 for delivering the influent from a source 104 to the treatment zone 100 through conduit means 105; a flow meter 106 operatively coupled to pump 103 for measuring the flow rate therethrough; a valve 109 for adjusting the flow rate of the effluent stream from effluent outlet 102 through conduit means 110; a flow meter 111 operatively coupled to valve 109 for monitoring the flow rate of the effluent stream therethrough; an analyzer 112; a controller 113 operatively coupled to analyzer 112; conduit means 116, 118, and 120 for delivering samples of the influent stream, the effluent stream, and the aqueous solution within treatment zone 100 to membrane separators 122, 124, and 126, respectively; pumps 128, 130, 132 for drawing the samples through the hollow fibers within membrane separators 122, 124, and 126 and for drawing the non-permeate streams depleted in the constituent through conduit means 134, 136, and 138 to appropriate discharge means (not shown); conduit means 140, 142, and 144 for delivering the permeate streams concentrated with respect to the constituent from membrane separators 122, 124, and 126 to analyzer 112; electrical control feedback lines 146 and 148 for transmitting signals from controller 1 13 to pump 103 and valve 109, respectively for the adjustment thereof; an optional source of pH regulating material 150 operatively coupled to conduit means 105 through conduit means 152; electrical control feedback line 155 for transmitting signals from controller 113 to adjust valve 154; optional temperature control means 156 operatively coupled to treatment zone 100 through means 158; and electrical control feedback line 160 for transmitting signals from controller 113 to temperature control means 156 for adjusting the temperature of treatment zone 100.

The influent fluid stream enters the treatment zone 100 through inlet 101. Within treatment zone 100, biomass contacts at least one biodegradable constituent within the fluid stream and consumes or degrades it, producing a treated effluent stream. The effluent stream exits treatment zone 100 through outlet 102.

Figure 3:
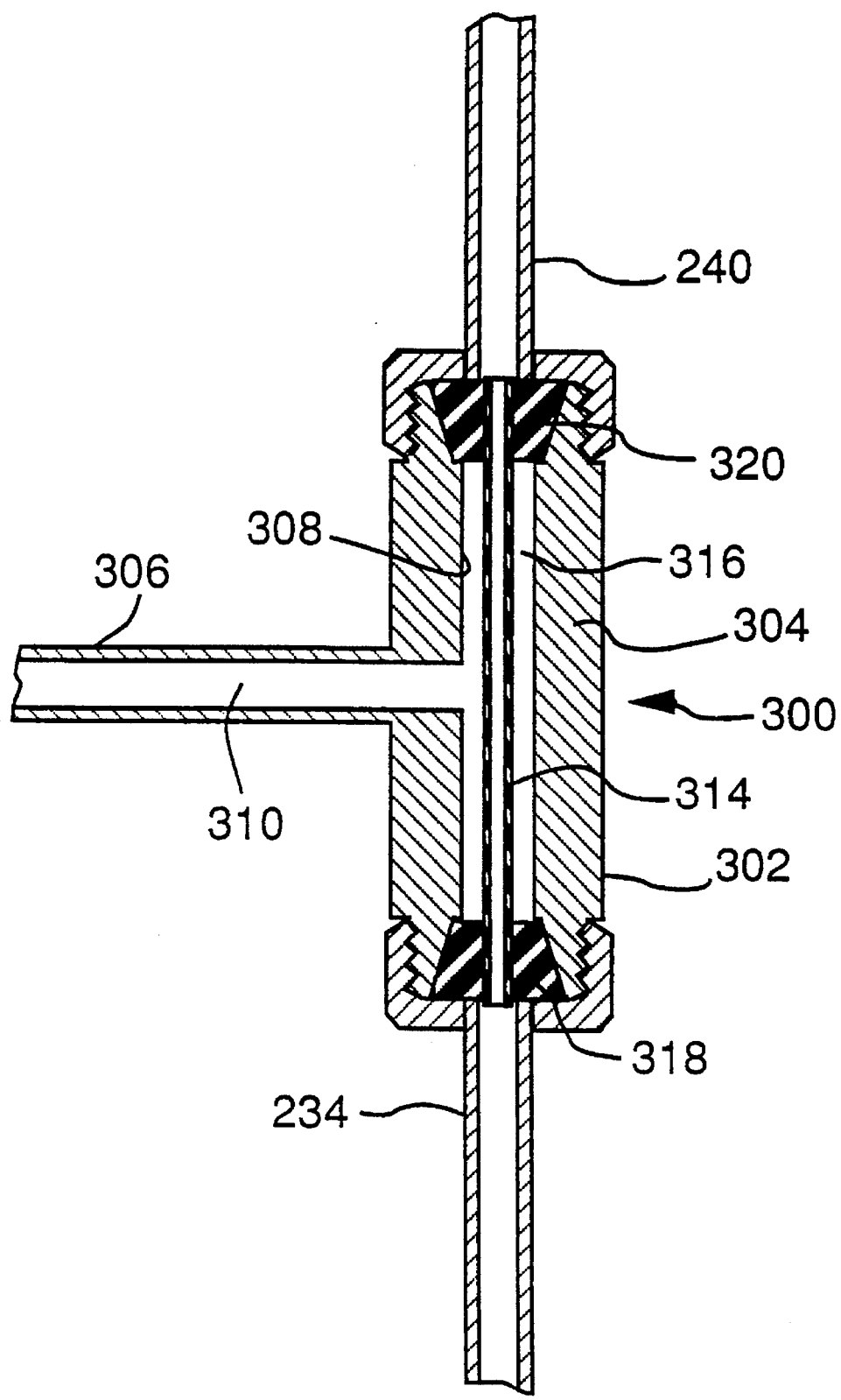
FIG. 3 is a greatly enlarged, cross sectional view of a membrane separator adapted for use with the apparatus of FIG. 2.

Conduit means 116, 118, and 120 continuously deliver samples of the influent stream, the effluent stream, and the aqueous solution within treatment zone 100 to membrane separators 122, 124, and 126, respectively, which are more fully described in the discussion of FIG. 3. Membrane separators 122, 124, and 126 serve to remove particulate matter from the samples and to concentrate the samples with respect to the constituent to be measured. Conduit means 134, 136, and 138 deliver the non-permeate, depleted with respect to the constituent, from membrane separators 122, 124, and 136, respectively, to appropriate discharge means (not shown). Conduit means 140, 142, and 144 deliver the permeates concentrated with respect to the constituent, from membrane separators 122, 124, and 126, respectively, to analyzer 112.

Analyzer 112 measures a response for the constituent in each of the concentrated permeate stream samples. Analyzer 112 is further provided with the volumetric flow rates of the influent and effluent streams. Analyzer 112 relates the measured response for the constituent in each concentrated sample to the mass flow rate of the constituent in the sampled influent stream, effluent stream, and to the concentration of the constituent in the aqueous solution from the treatment zone 100. Analyzer 112 calculates the amount of the constituent removed by the biodegradation process as the product of the concentration of the constituent in the sampled influent stream and the flow rate of the influent stream at the time of sampling less the product of the concentration of the constituent in the sampled effluent stream and the flow rate of the effluent stream at the time of sampling.

Analyzer 112 provides the data received from the analysis to controller 113. In response to the data, controller 113, through electrical control feedback lines 146 and 148, adjusts the influent and effluent flow rates via pump 103 and valve 109, respectively, either increasing or decreasing the residence time of the fluid stream within treatment zone 100 accordingly. In the alternative, the controller, through electrical control feedback line 162, may signal pump 164 to increase or decrease the amount of material, e.g., water, flowing from source 166, through conduit means 168, into conduit means 105. This serves to alter the concentration of the constituent in the influent stream. Thus, this provides an alternate means of adjusting the mass flow rate of the constituent therein.

Controller 113, through electrical control feedback line 155, optionally further signals valve 154, which adjusts the pH of the influent stream. Controller 113, through electrical control feedback line 160, optionally further adjusts the temperature of treatment zone 100 through temperature control means 156. Such controls permit the obtention and maintenance of optimum treatment conditions and/or the production of a certain type or quality of effluent.

In the alternative, analyzer 112 may generate responses proportional to the mass flow rate of the constituent in the sampled streams. Such responses could be interpreted by controller 113, rather than by a microprocessor forming part of the analyzer 112.

As FIG. 1 illustrates, this invention utilizes an "on-line" determination process, i.e., a determination process which is operatively coupled to the overall treatment process. This "on-line" determination permits a continuous characterization of the process and eliminates the need for transporting samples to a laboratory for analysis. This determination enables the quick detection and control of changes in the treatment efficiency of the process, which may be critical in the maintenance of the living biomass systems. It also ensures that the samples are not contaminated or misidentified.

FIG. 2

Figure 2:
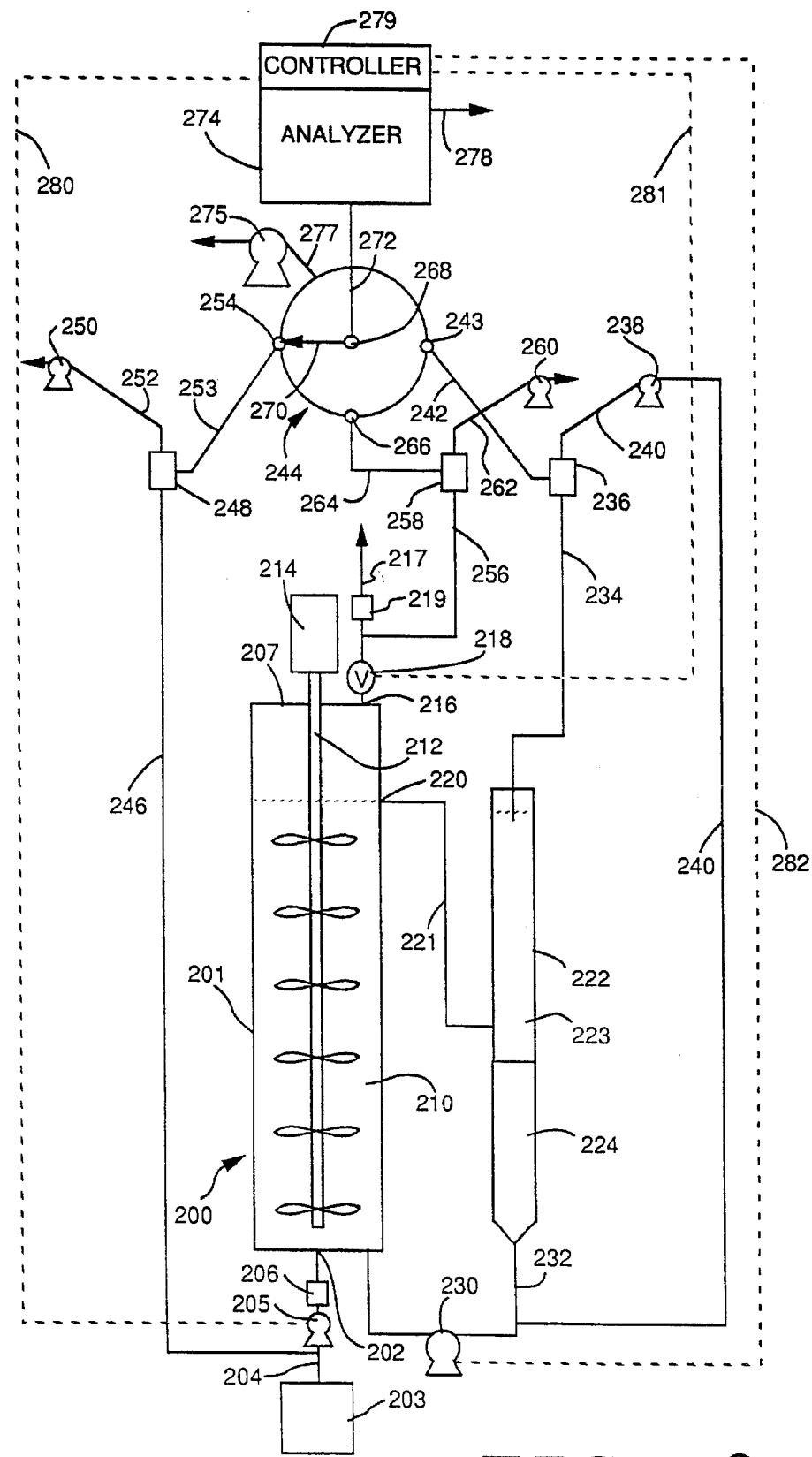
FIG. 2 is a schematic diagram of a self-regulated stirred bioreactor of this invention.

FIG. 2 is a schematic diagram of a self-regulated stirred bioreactor of this invention. The treatment zone 200 comprises a basin 201, which in turn has an inlet 202 for admitting an influent gas stream from a source 203 through conduit means 204. Pump 205 regulates the flow rate of the influent gas stream through conduit means 204. A flow meter 206, operatively coupled to valve 205, measures the flow rate therethrough.

Basin 201 is sealed at its upper end 207. Basin 201 is adapted to contain an aqueous suspension of living biomass 210. A stirrer 212, formed of a material inert to the biomass and the influent and effluent gas streams, is rotated by a motor 214, to inhibit the accumulation of biosludge at the bottom of basin 201.

Basin 201 has an outlet 216 for discharging the effluent gas stream through conduit means 217 in an appropriate manner. Valve 218 regulates the flow rate of the effluent gas stream through conduit means 217. A flow meter 219, operatively coupled to valve 218, measures the flow rate therethrough.

Basin 201 has a second outlet 220 through which the aqueous suspension 210 may flow via conduit means 221 to a clarifier 222, in which particles of the biomass 224 may settle to produce a clarified liquid 223. A pump 230 directs the recycling of the settled biomass particles 224 from the clarifier 222 to the basin 201 via conduit means 232.

Conduit means 234 transport a portion of the clarified liquid 223 from conduit means 228 to a membrane separator 236. Pump 238 pulls the portion through membrane separator 236, and pulls the non-permeate through conduit means 240 for recycle to conduit means 232. In the alternative, conduit means 240 may serve as discharge means, to the extent appropriate. In this latter case, water will preferably be provided to basin 201, to compensate for that lost through such discharge means. Conduit means 242 convey the permeate from membrane separator 236 to inlet port 243 of a rotary switching device 244, such as that produced by Valco Instruments Co., Inc. Any suitable stream select device may be utilized in the place of the depicted rotary switching device. For instance, a manifold with multiple three-way valves, such as is available from Skinner Valve Co., or a manifold with multiple valve-membrane combinations such as described in co-pending application Ser. No. 455,472, filed Dec. 22, 1989, may likewise be used.

Conduit means 246 transport a portion of the influent gas stream to a membrane separator 248. Pump 250 pulls the portion through membrane separator 248, and pulls the non-permeate through conduit means 252 to appropriate discharge means (not shown). Conduit means 253 convey the permeate from membrane separator 248 to inlet port 254 of rotary switching device 244. Conduit means 256 transport a portion of the effluent gas stream to a membrane separator 258. Pump 260 pulls the portion through membrane separator 258, and pulls the non-permeate through conduit means 262 to appropriate discharge means (not shown). Conduit means 264 convey the permeate from membrane separator 258 to inlet port 266 of rotary switching device 244.

In this embodiment, rotary switching device 244 has a rotor 268 which carries a coupling tube 270 which may be connected to any selected one of inlet ports 243, 254, and 266 in response to the rotation of rotor 268. Rotary switching device 244 also has a stationary delivery tube 272 in communication with analyzer 274, which, in the disclosed embodiment, comprises a Balzer QMG 511 quadruple mass spectrometer. A vacuum pump 275, such as that manufactured by Alcatel, removes materials not to be introduced into analyzer 274 from rotary switching device 244, by pulling such materials through conduit means 277 to appropriate discharge means (not shown). Rotary switching device 244 permits the sequential introduction of the permeates from the membrane separators 236, 248, and 258 to analyzer 274 through delivery tube 272. Rotary switching device 244 may be controlled manually or by a computer or other timing device, permitting the sampling of the analyte(s) extracted from different process streams at predetermined intervals.

Analyzer 274 may comprise a mass spectrometer, a gas or liquid chromatograph, an infrared spectrometer, an ultraviolet/visible spectrometer, a flame emission spectrometer, any other analyzer capable of accurately detecting the nature and concentration of the analyte, or combinations thereof. Of these, the mass spectrometer is preferred, due to its ability to yield "fingerprints" of multiple components within a given analyte mixture, and to sequentially analyze analyte streams nearly instantaneously. Analyzed analyte streams are discharged from analyzer 274, in an appropriate manner, via conduit means 278.

Controller 279 is operatively coupled to analyzer 274. Controller 279 may be a computer, such as a CAMILE process control computer available from The Dow Chemical Company or such as that designated PDP 11-73 by Digital Equipment Corporation. Controller 279 is connected to a power source (not shown). Controller 279 is further connected to pump 205 and to valve 218, by electrical conducting means, 280 and 281, respectively. Controller 279 responds to variations in the concentration of the constituent in question and signals, through electrical conducting means 280 and 281, the adjusting of pump 205 and valve 218, respectively, to increase or decrease the pressure and residence time of the gas stream within the basin 201. Controller 279 also optionally controls the variable speed pump 230, through electrical conducting means 282, to increase or decrease the rate of recirculation of the aqueous solution containing biomass.

FIG. 3

As shown in FIG. 3, the membrane separator 300, in one preferred embodiment, comprises a T-shaped body 302 having a tubular section 304 from which a hollow stem 306 extends for connection to conducting means such as those indicated by reference numeral 242 of FIG. 2. The tubular section 304 has a bore 308 therein, in communication with the bore 310 of the hollow stem 306. A tubular membrane 314, preferably fabricated of a semipermeable material, such as medical grade poly(dimethylsiloxane) tubing manufactured by the Dow Corning Corporation, is accommodated in the bore 308. The outside diameter of the tubular membrane 314 is less than the diameter of the bore 308, thereby providing an annular space 316 which materials permeating through the membrane walls may enter. At opposite ends of the tubular section 304 are appropriate seals 318 and 320 for providing an airtight joint between the membrane separator 300 and conducting means such as those indicated by reference numerals 234 and 240 of FIG. 2, respectively.

The membrane separator 300 functions as follows. The clarified liquid, such as that indicated by reference numeral 223 of FIG. 2 passes into the lumen of the hollow fiber membrane 314. The constituents for which the mass flow rates are to be determined pass through the wall of tubular membrane 314 into the annular space 316. Such constituents pass from annular space 316, through conduit means such as those indicated by reference numeral 242 of FIG. 2 to the rotary switching device such as that indicated by reference numeral 244 of FIG. 2, for introduction into an analyzer such as that indicated by reference numeral 274 of FIG. 2. The non-permeate stream preferably passes from the lumen, and is recycled back to the basin through conduit means, such as those indicated by reference numeral 240 of FIG. 2.

The membrane separator 300 serves to extract from the stream a portion of the particular analyte or analytes of interest. The tubular membrane 314 is, in one case, selected on the basis of its ability to preferentially permeate the analyte, thus producing a permeate rich in the analyte or analytes and a non-permeate rich in, e.g., particulate matter and water. In the alternative, the tubular membrane 314 may be selected on the basis of its ability to preferentially reject the analyte, while permitting the permeation of any components of the stream not be be measured. In the latter case, the non-permeate would be fed to analyzer, with the permeate being periodically or continuously removed from the membrane separator.

A discussion of the membrane separator in great detail is presented in *Anal. Chem.*, 62, 1265–1271 (1990), the relevant portions herein incorporated by reference. As set forth therein, poly(dimethylsiloxane) elastomeric membranes are useful in the extraction of $C_1$ and $C_2$ halogenated hydrocarbons, benzene, ethylbenzene, and various chlorobenzenes. This reference further describes an alternate membrane separator which may provide utility. This and other membrane separators are likewise described in case Serial No. (Attorney docket number C-38,434) to LaPack, et al., entitled "Apparatus and Methods for On-Line Analysis of One or More Process Streams" filed concurrently herewith, the relevant portions being incorporated by reference.

Those having skill in the art will recognize the suitability of other membrane materials for the removal of volatile organics from liquid or gaseous streams, e.g., various other siloxane materials; syndiotactic polystyrene; polyolefins such as polyethylene, polypropylene, ethylene-propylene copolymers, polybutadiene, ethylene-acrylic acid copolymers, and poly-4-methylpentene; fluoropolymers such as polytetrafluorethylene , ethylene-tetrafluoroethylene copolymers, polyvinyl fluoride, and polyvinylidene fluoride; chloropolymers such as polyvinyl chloride and polyvinylidene chloride; polyetheretherketones; and polysulfones. Should the analyte of interest be a dissolved gas, e.g., sulfur dioxide, a gas separation membrane may be used. Such membranes, as is known in the art, may be suitably fabricated of, e.g., polyethersulfone, polyvinylalcohol, polyacrylonitrile, polycarbonates of halogenated bisphenol-A, elastomeric polymers such as silicone rubber, and some of those described above, among others.

In the case of gaseous process streams, membrane separators will preferably, but not necessarily, be provided between the point of sampling and the rotary switching device. As even complex gaseous process streams may be analyzed directly by a mass spectrometer, pretreatment is in general unnecessary. However, if the gaseous stream carries with it particulate matter or non-organic droplets of liquid, pretreatment to remove such materials may be essential. Moreover, pretreatment by the membrane separator to concentrate the analyte with respect to the constituent in question may be beneficial. The extent to which pretreatment affects the concentration of the constituent in the analyte may be determined by calibration with a known solution.

Given the dependence of permeability on temperature, the membrane separation device, the rotary switching device and the delivery tube are preferentially maintained at a constant pre-selected temperatures. The temperature selected is a function of the membrane in question and the constituent to be separated therefrom and analyzed. First, the temperature should be high enough to volatilize the constituent to be analyzed, but not so high as to promote plasticization of or have deleterious effects on the membrane. Second, it is known that as temperature increases over the desired operating range, the transport time through the membrane generally decreases while the selectivity of the membrane generally decreases. Likewise, as temperature decreases, the transport time through the membrane increases while the selectivity of the membrane increases. Thus, when a given constituent is present at a low concentration (where good selectivity is important) or when the process is slow changing (where longer transport times are tolerable), lower temperatures will be preferred. Similarly, when a given constituent is present in a high concentration (where good selectivity is less critical) or when the process is quickly changing (where faster transport times are required), higher temperatures will be preferred.

In the case of poly(dimethylsiloxane) elastomeric membranes, and analytes containing $C_1$ or $C_2$ halogenated hydrocarbons, benzene, ethylbenzene, or chlorobenzenes, the membrane will preferably be maintained at temperatures between about 0° C. and about 100° C.

FIG. 4

Figure 4:
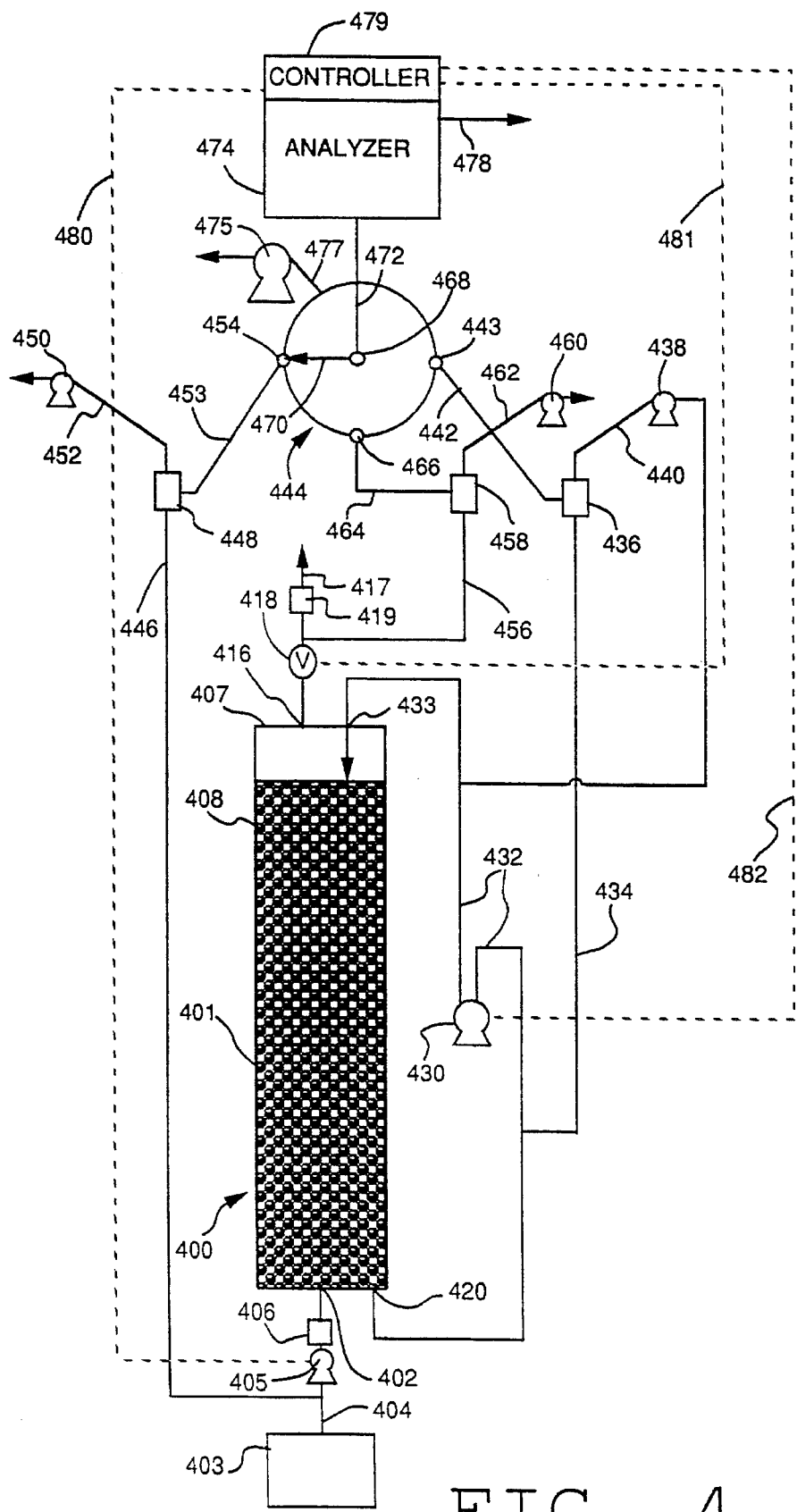
FIG. 4 is a schematic diagram of a self-regulated countercurrent flow bioreactor of this invention.

FIG. 4 is a schematic diagram of a self-regulated countercurrent flow bioreactor of this invention. The treatment zone 400 comprises a basin 401, which in turn has an inlet 402 for admitting an influent gas stream from a source 403 through conduit means 404. Pump 405 regulates the flow rate through conduit means 404. Flow meter 406, operatively coupled to pump 405, measures the flow rate of the influent gas stream therethrough.

Basin 401 is sealed at its upper end 407. Basin 401 is adapted to contain highly porous lava rock 408 for supporting the biomass.

Basin 401 has an outlet 416 for discharging the effluent gas stream in an appropriate manner through conduit means 417. Valve 41 regulates the flow rate through conduit means 417. Flow meter 419, operatively coupled to valve 418, measures the flow rate of the effluent gas stream therethrough.

Basin 401 has a second outlet 420. A pump 430 directs the recirculation of the aqueous solution in which the biomass is immersed from second outlet 420, through conduit means 432, to a second inlet 433 of basin 401. The water thus flows from the second inlet 433, over the biomass supported on lava rock 408 to the second outlet 420, in a direction countercurrent to that of the gas stream, which flows from inlet 402 to outlet 416.

Conduit means 434 transport a portion of the recirculated water from conduit means 432 to membrane separator 436. Pump 438 draws the portion through membrane separator 436, and draws the non-permeate out through conduit means 440 for recirculation to conduit means 432. In the alternative, conduit means 440 may serve as discharge means, to the extent appropriate. In this latter case, water will preferably be provided to basin 401, to compensate for that lost through such discharge means. Conduit means 442 convey the permeate from membrane separator 446 to inlet port 443 of rotary switching device 444.

Conduit means 446 transport a portion of the influent gas stream to membrane separator 448. Pump 450 pulls the portion through membrane separator 448, and pulls the non-permeate through conduit means 452 to discharge means not shown). Conduit means 453 convey the permeate from membrane separator 448 to inlet port 454 of rotary switching device 444.

Conduit means 456 transport a portion of the effluent gas stream to membrane separator 458. Pump 460 pulls the portion through membrane separator 458, and pulls the non-permeate through conduit means 462 to discharge means (not shown). Conduit means 464 convey the permeate from membrane separator 458 to inlet port 466 of rotary switching device 444.

Rotary switching device 444 has a rotor 468 which carries a coupling tube 470, which may be connected to any selected one of inlet ports 443, 454, and 466 in response to the rotation of rotor 468. Rotary switching device 444 also has a stationary delivery tube 472 in communication with analyzer 474. Vacuum pump 475 removes materials not to be introduced into analyzer 474 from rotary switching device 444 by pulling such material through conduit means 477 to appropriate discharge means (not shown). Rotary switching device 444 permits the sequential introduction of the permeates from membrane separators 436,448, and 458 to analyzer 474. Analyzed analyte streams are discharged from analyzer 474 in an appropriate manner via conduit means 478.

Controller 479, operatively coupled to analyzer 474, is connected to pump 405, to valve 418, and optionally to pump 430 by electrical conducting means 480, 481, and 482 for the adjustment thereof.

Any solid support having a large surface area may be used in place of the lava rock 408. For instance, synthetic porous materials useful in trickling filter technology may find utility. For instance, polypropylene, and polyethylene are particularly useful synthetic support materials. In the alternative, the basin 401 may be filled with gravel or soil upon which the biomass will grow. Further, the second inlet 433 may comprise a spray mechanism for spraying the recirculated water onto the lava rock 408.

While the embodiment as set forth in FIG. 4 utilizes a scheme of countercurrent flow between the water and the gas stream, the practitioner will recognize that such a scheme, while preferred, is not essential. In the alternative, pump 430 may induce the movement of the water from a third outlet near second inlet 433, yet in contact with the lava rock 408, to a third inlet near second outlet 420. In this embodiment, both the water and the gas stream would flow through basin 401 in the same direction.

FIG. 5

FIG. 5 is a schematic diagram of a self-regulated stirred biological reactor of this invention, useful for the treatment of liquid streams, utilizing both biodegradation and gas stripping treatments. The treatment zone 500 comprises a basin 501. Basin 501 has an inlet 502 for the introduction of the waste liquid stream from source 500 through conduit means 504. Pump 505 regulates the flow rate through conduit means 504. Flow meter 506, operatively coupled to pump 505, measures the flow rate of the influent liquid stream therethrough.

Basin 501 is sealed at its upper end 507. Basin 501 is adapted to contain an aqueous suspension of living biomass 510. Stirrer 512 is rotated by motor 514.

Basin 501 has a first outlet 520 for discharging the effluent liquid stream from basin 501. The effluent liquid stream carrying biomass flows via conduit means 521 to clarifier 522, in which particles of the biomass 524 settle to produce a clarified effluent liquid stream 523. The clarified liquid effluent 523 is discharged from clarifier 522 via conduit means 528 to an appropriate drain. Pump 530 recycles the settled biomass particles 524 from clarifier 522 to second inlet 531 of basin 501 through conduit means 532.

Basin 501 has a third inlet 535 for introducing an influent gas stripping stream from source 536 through conduit means 537. Pump 538 regulates the flow rate of the influent gas stripping stream through conduit means 537. Flow meter 539, operatively coupled to pump 538, measures the flow rate therethrough.

Basin 501 has a second outlet 540 for the discharge of the effluent gas stripping stream through conduit means 541 in an appropriate manner. Valve 542 regulates the flow rate of the effluent gas stripping stream through conduit means 541. Flow meter 543, operatively coupled to valve 542, measures the flow rate therethrough.

Conduit means 550, 551, 552, and 553 divert portions of the influent liquid stream, the clarified effluent liquid, the influent gas stripping steam, and the effluent gas stripping stream, respectively, to membrane separators 555, 556, 557, and 558, respectively. Pumps 560, 561, 562, and 563 pull the portions through membrane separators 555, 556, 557, and 558, respectively, and pull the non-permeates through conduit means 565, 566, 567, and 568, respectively to appropriate discharge means (not shown). Conduit means 570, 571, 572, and 573 convey the permeates from membrane separators 555, 556, 557, and 558, respectively, to inlet ports 575, 576, 577, and 578, respectively of rotary switching device 579.

Rotary switching device 579 has a rotor 580 which carries a coupling tube 581, which may be connected to any selected one of inlet ports 575, 576, 577, and 578 in response to the rotation of rotor 580. Rotary switching device 579 also has a stationary delivery tube 582 in communication with analyzer 583. Vacuum pump 584 removes materials not to be introduced into analyzer 583 from rotary switching device 579 by pulling such materials through conduit means 586 to appropriate discharge means (not shown). Analyzed analytes are discharged from analyzer 583 through appropriate discharge means 587.

Controller 588 is operatively coupled to analyzer 583. Controller 588 is connected to pumps 505 and 538, to valve 542, and optionally to pump 530 through electrical conducting means 589, 590, 591, and 592, respectively for the adjustment thereof.

FIG. 6

Figure 6:
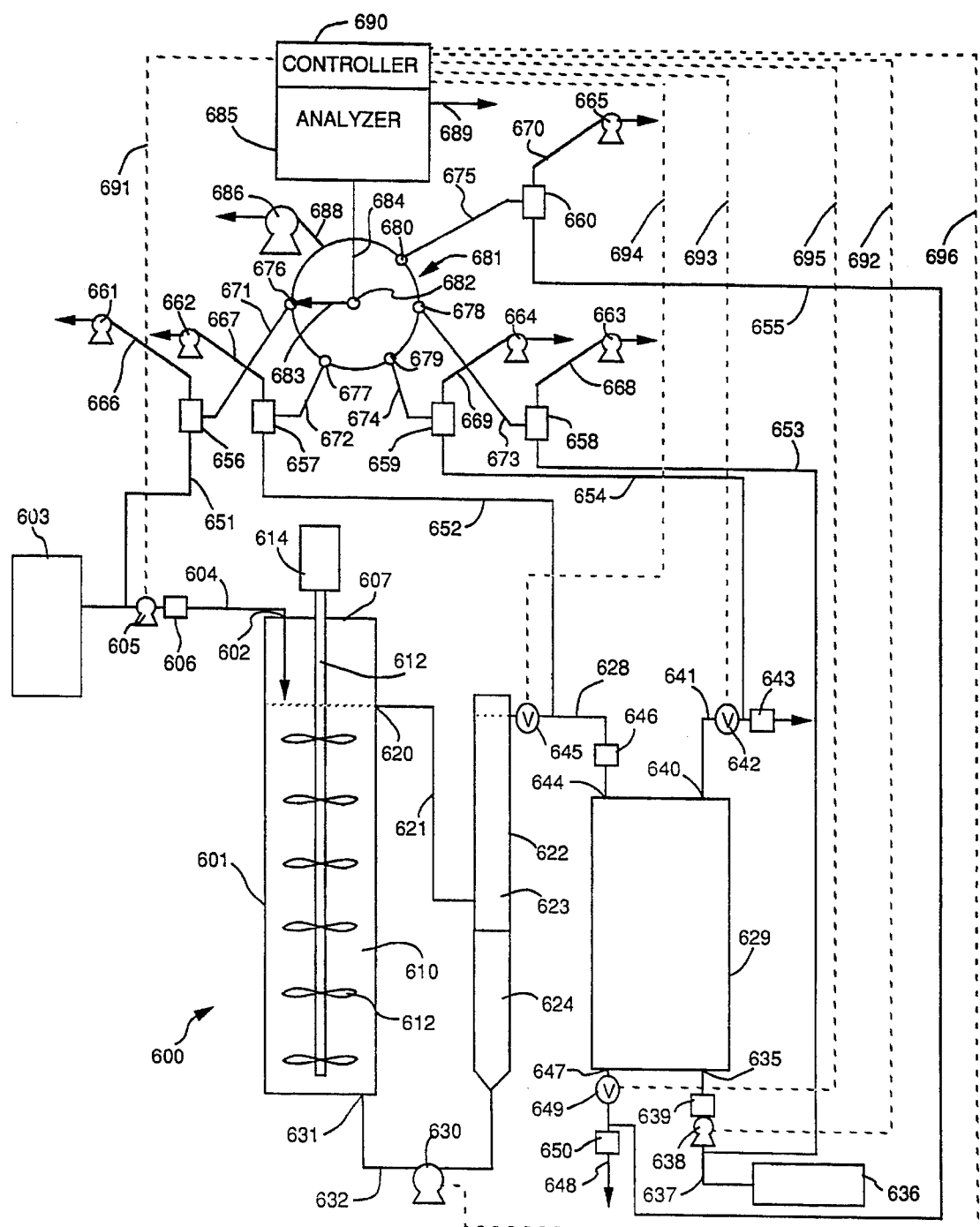
FIG. 6 is a schematic diagram of a self-regulated stirred bioreactor positioned upstream with respect to a separate gas stripping reactor.

FIG. 6 is a schematic diagram of a self-regulated stirred biological reactor of this invention, useful for the treatment of liquid streams, utilizing a gas stripping treatment downstream with respect to a biodegradation treatment. Such an arrangement would be particularly advantageous when the influent liquid contains two constituents, one of which both biodegrades and strips well and the other of which biodegrades poorly and strips well. An example of such a system is a stream comprising dichloromethane which biodegrades well and strips well and carbon tetrachloride which biodegrades poorly and strips well. In this case, to prevent competition between the biodegradation and gas stripping processes, the biodegradation basin should be positioned upstream with respect to the gas stripper. If the biodegradation process is aerobic, i.e., requires oxygen, the oxygen may be provided to the water with membranes to prevent gas stripping in the biodegradation basin caused by bubbling.

As set forth in FIG. 6, treatment zone 600 in part comprises a basin 601 and a gas stripper 629. Basin 601 has an inlet 602 for the introduction of the waste liquid stream from source 603 through conduit means 604. Pump 605 regulates the flow rate through conduit means 604. Flow meter 606, operatively coupled to pump 605, measures the flow rate of the influent liquid stream therethrough.

Basin 601 is sealed at its upper end 607. Basin 601 is adapted to contain an aqueous suspension of living biomass 610. Stirrer 612 is rotated by motor 614.

Basin 601 has an outlet 620 for discharging the biodegraded liquid stream. The biodegraded liquid stream carrying biomass flows via conduit means 621 to clarifier 622, in which particles of the biomass 624 settle to produce a clarified biodegraded liquid stream 623. The clarified biodegraded liquid stream 623 is discharged from clarifier 622 via conduit means 628 to gas stripper 629. Pump 630 recycles the settled biomass particles 624 from clarifier 622 to inlet 631 of basin 601 through conduit means 632.

Gas stripper 629 has a first inlet 635 for introducing an influent gas stripping stream from source 636 through conduit means 637. Pump 638 regulates the flow rate of the influent gas stripping stream through conduit means 637. Flow meter 639, operatively coupled to pump 638, measures the flow rate therethrough.

Gas stripper 629 has a first outlet 640 for discharging the effluent gas stripping stream, in an appropriate manner, through conduit means 641. Valve 642 regulates the flow rate of the effluent gas stripping stream through conduit means 641. Flow meter 643, operatively coupled to valve 642, measures the flow rate therethrough.

Gas stripper 629 has a second inlet 644 for introducing the clarified biodegraded liquid stream from conduit means 628. Valve 645 regulates the flow rate of the clarified biodegraded liquid stream through conduit means 628. Flow meter 646, operatively coupled to valve 645, measures the flow rate therethrough.

Gas stripper 629 has a second outlet 647 for discharging, in an appropriate manner, the stripped clarified biodegraded liquid stream through conduit means 648. Valve 649 regulates the flow rate of the stripped clarified biodegraded liquid stream through conduit means 648. Flow meter 650, operatively coupled to valve 649, measures the flow rate therethrough.

Conduit means 651, 652, 653, 654, and 655 divert portions of the influent liquid stream, the clarified biodegraded liquid stream, the influent gas stripping steam, the effluent gas stripping stream, and the stripped clarified biodegraded liquid stream, respectively, to membrane separators 656, 657, 658, 659, and 660, respectively. Pumps 661, 662, 663, 664, and 665 pull the portions through membrane separators 656, 657, 658, 659, and 660 respectively, and pull the non-permeates through conduit means 666, 667, 668, 669, and 670, respectively to appropriate discharge means (not shown). Conduit means 671, 672, 673, 674, and 675 convey the permeates from membrane separators 656, 657, 658, 659, and 660, respectively, to inlet ports 676, 677, 678, 679, and 680, respectively of rotary switching device 681.

Rotary switching device 681 has a rotor 682 which carries a coupling tube 683, which may be connected to any selected one of inlet ports 676, 677, 678, 679, and 680 in response to the rotation of rotor 682. Rotary switching device 681 also has a stationary delivery tube 684 in communication with analyzer 685. Vacuum pump 686 removes materials not to be introduced into analyzer 685 from rotary switching device 681 by pulling such materials through conduit means 688 to appropriate discharge means (not shown). Analyzed analytes are discharged from analyzer 683 through appropriate discharge means 689.

Controller 690 is operatively coupled to analyzer 685. Controller 690 is connected to pumps 605 and 638, to valves 642, 645, and 649, and optionally to pump 630 through electrical conducting means 691, 692, 693, 694, 695, and 696, respectively for the adjustment thereof.

FIG. 7

Figure 7:
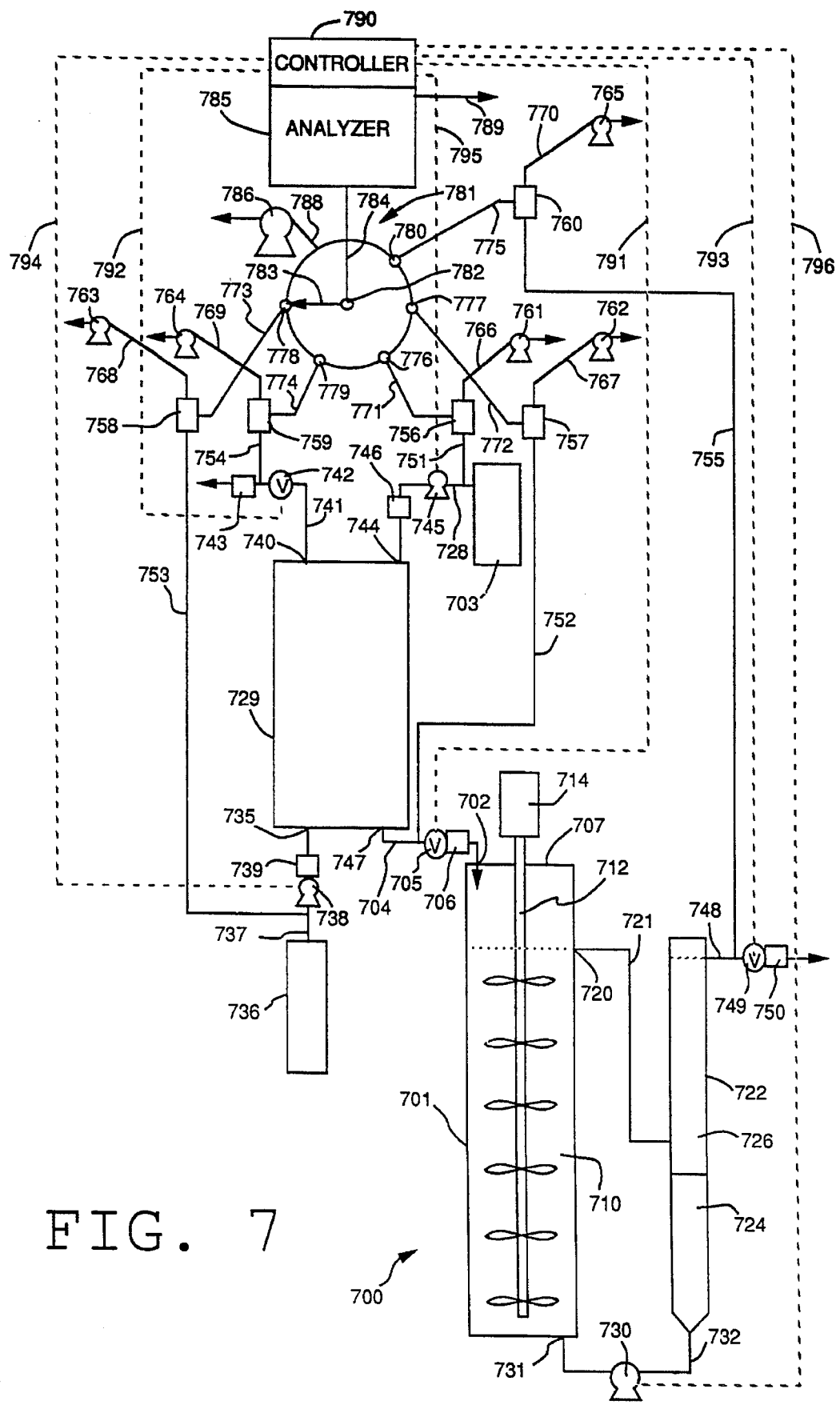
FIG. 7 is a schematic diagram of a self-regulated stirred bioreactor positioned downstream with respect to a separate gas stripping reactor.

FIG. 7 is a schematic diagram of a self-regulated stirred biological reactor of this invention, useful for the treatment of liquid streams, utilizing an gas stripping treatment upstream with respect to a biodegradation treatment. This embodiment differs from the embodiment set forth in FIG. 6 principally in the arrangement of the basin 701, the clarifier 722, and the gas stripper 729. Such an arrangement would be particularly advantageous in systems where the fluid stream to be treated contains a constituent which biodegrades well but strips poorly, and another constituent which strips well but which biodegrades poorly or even poisons the biomass. An example of such a system is chlorophenol and ammonia. Another example for this configuration would be a system of cellulose that is treated by anaerobic biodegradation. Oxygen, which is poisonous to anaerobic biomass may be stripped with a nitrogen stream in gas stripper 729 prior to biodegradation of the cellulose in basin 701.

As set forth in FIG. 7, treatment zone 700 in part comprises a basin 701 and a gas stripper 729. Gas stripper 729 has a first inlet 735 for introducing an influent gas stripping stream from source 736 through conduit means 737. Pump 738 regulates the flow rate of the influent gas stripping stream through conduit means 737. Flow meter 739, operatively coupled to pump 738, measures the flow rate therethrough.

Gas stripper 729 has a first outlet 740 for discharging the effluent gas stripping stream, in an appropriate manner, through conduit means 741. Valve 742 regulates the flow rate of the effluent gas stripping stream through conduit means 741. Flow meter 743, operatively coupled to valve 742, measures the flow rate therethrough.

Gas stripper 729 has a second inlet 744 for introducing the liquid influent from source 703 through conduit means 728. Pump 745 regulates the flow rate through conduit means 728. Flow meter 746, operatively coupled to pump 745, measures the flow rate of the influent liquid stream therethrough.

Gas stripper 729 has a second outlet 747 for discharging the stripped liquid effluent through conduit means 704 to basin 701. Basin 701 has a first inlet 702 for introducing the stripped liquid effluent from conduit means 704. Valve 705 regulates the flow rate of the liquid effluent through conduit means 704. Flow meter 706, operatively coupled to valve 705, measures the flow rate therethrough.

Basin 701 is sealed at its upper end 707. Basin 701 is adapted to contain an aqueous suspension of living biomass 710. Stirrer 712 is rotated by motor 714.

Basin 701 has an outlet 720 for discharging the biodegraded stripped liquid stream with biomass suspended therein. The biodegraded stripped liquid stream flows via conduit means 721 to clarifier 722, in which particles of the biomass 724 settle to produce a clarified biodegraded stripped liquid stream 723. Pump 730 recycles the settled biomass particles 724 from clarifier 722 to inlet 731 of basin 701 through conduit means 732. The clarified biodegraded stripped liquid stream 726 is discharged from clarifier 722, in an appropriate manner, via conduit means 748. Valve 749 regulates the flow rate of the clarified biodegraded stripped liquid stream through conduit means 748. Flow meter 750, operatively coupled to valve 749, measures the flow rate therethrough.

Conduit means 751, 752, 753, 754, and 755 divert portions of the influent liquid stream, the stripped liquid stream, the influent gas stripping steam, the effluent gas stripping stream, and the biodegraded stripped clarified liquid stream, respectively, to membrane separators 756, 757, 758, 759, and 760, respectively. Pumps 761, 762, 763, 764, and 765 pull the portions through membrane separators 756, 757, 758, 759, and 760 respectively, and pull the non-permeates through conduit means 766, 767, 768, 769, and 770, respectively to appropriate discharge means (not shown). Conduit means 771, 772, 773, 774, and 775 convey the permeates from membrane separators 756, 757, 758, 759, and 760, respectively, to inlet ports 776, 777, 778, 779, and 780, respectively of rotary switching device 781.

Rotary switching device 781 has a rotor 782 which carries a coupling tube 783, which may be connected to any selected one of inlet ports 776, 777, 778, 779, and 780 in response to the rotation of rotor 782. Rotary switching device 781 also has a stationary delivery tube 784 in communication with analyzer 785. Vacuum pump 786 removes materials not to be introduced into analyzer 785 from rotary switching device 781 by pulling such materials through conduit means 788 to appropriate discharge means (not shown). Analyzed analytes are discharged from analyzer 783 through appropriate discharge means 789.

Controller 790 is operatively coupled to analyzer 785. Controller 790 is connected to valves 705, 742, and 749, to pumps 738 and 745 and optionally to pump 730 through electrical conducting means 791, 792, 793, 794, 795, and 796 respectively for the adjustment thereof.

In each of the illustrative embodiments depicted in the FIGS. 1–7, the membrane separators have received and pretreated only a portion of the stream sampled, with the remainder of the stream being conducted to a drain or appropriate destination. In the alternative, each process stream to be analyzed may be passed through the membrane separator in its entirety. In such cases, to accommodate the increased volumetric flow, the membrane separator may comprise, one or more membrane devices, e.g., a hollow fiber module, tubular membrane, or spiral membrane device.

In the systems contemplated, the mass flow rate of the constituent in question in at least one of the effluent fluid and effluent stripping streams should be less than that of the corresponding influent streams, signaling the partial purification of the stream. Initially, a part of the difference between the mass flow rate in the effluent stream and the mass flow rate in the influent stream is attributed to the solvation of the constituent(s) to be analyzed, to the extent to which they are soluble, in the aqueous solution in which the biomass is immersed. As the system reaches a steady state, the mass flow rate of the constituent solubilized in the biomass-containing aqueous solution will become constant, if the influent mass flow rates are constant.

To optimize the performance of the system, the practitioner would wish to maximize the uptake of the constituent in question by the biomass, and/or by the gas stripping stream, while requiring only a tolerable residence time within the bioreactor and/or the gas stripper. In accordance with this objective, the practitioner could monitor and record the mass flow rate due to the biouptake of the constituent and/or the gas stripping of the constituent versus the corresponding residence time, for a variety of residence times. The plot should reflect that for residence times greater than the optimum residence time, no significant increase in the mass flow rate due to the biouptake and/or gas stripping of the constituent occurs.

In addition to permitting the direct monitoring of the mass flow rate of particular constituents within the influent and effluent streams, this invention permits the direct monitoring of the health of the biomass. In preferred embodiments, a sample of the aqueous solution in which the biomass is immersed is directed to a membrane separator, which concentrates the samples with respect to at least one organic constituent contained therein. Periodic analysis of such samples enables the preparation of an environmental profile for the biomass. Such a profile might contain information as to the concentration of the constituents dissolved in the aqueous solution, and/or the concentration of certain gases, e.g. oxygen, nitrogen, and carbon dioxide dissolved in the aqueous solution. Additional analyzers may be utilized to monitor such conditions as the pH and the temperature of the aqueous solution. Should the biomass not efficiently consume the desired constituents, the practitioner may accordingly make adjustments to correct any perceived anomalies in the environmental profile. Appropriate adjustments may be made regarding volumetric and/or mass flow rates, pH, temperature, and nutrient content. Such monitoring permits the correction of abnormal or undesirable conditions surrounding the biomass before such conditions adversely affect the biomass.

In one particular embodiment, the biodegradation basin will be provided with means for monitoring the temperature at various points within the biodegradation basin, e.g., through one or more thermocouples. Should the temperature spike at any such point, the aqueous solution could be sampled and analyzed from that and optionally additional points to determine the cause of the spike.

Further, the subject invention, by enabling the establishment and maintenance of steady state conditions, enables the minimization, if not the elimination, of undesirable biosludge. Biosludge results when the biomass converts consumed constituents to protoplasm faster than the biomass organisms die off. Such biosludge must be periodically removed from the treatment basin and disposed of. This invention thus provides a means for establishing a continuous culture. Should the amount of protoplasm produced exceed the rate at which the organisms die off, the controller may signal the closing of all influent valves, until such time as the biomass can consume the constituents without producing amounts of protoplasm which exceed those lost during normal biomass death.

The textbook *Wastewater Engineering: Treatment Disposal, Reuse*, 2nd Edition, McGraw-Hill Book Company, New York (1979), at pages 419–424, herein incorporated by reference, provides mass balance equations for the microorganisms in a continuous flow stirred tank reactor, and information pertaining thereto. The textbook, at pages 431–435, herein incorporated by reference, provides similar equations for a continuous flow stirred tank reactor with recycle. Such equations are useful to describe the mass of the microorganisms in a continuous culture.

The subject invention may be used in both aerobic and anaerobic degradation processes. Aerobic degradation processes regulated in accordance with the subject invention will enable the efficient removal of, e.g., aliphatic hydrocarbons, aromatic compounds and halogenated hydrocarbons. Anaerobic degradation processes regulated in accordance with the subject invention will enable the efficient removal of, e.g., cellulose; sulfur-containing compounds such as mercaptans, organosulfides, dimethylsulfoxide, dimethylsulfide, dimethyldisulfide, hydrogen sulfide, sulfur dioxide; nitrogen-containing compounds; and arsenic-containing compounds. Should a waste stream contain a constituent which aerobically biodegrades well and another constituent which anaerobically biodegrades well, it would be advantageous to provide an anaerobic basin upstream with respect to an aerobic basin, with the stream treated in the former being passed on for treatment in the latter.

Likewise, if the fluid stream to be treated contains two constituents, each capable of being degraded by a different type of biomass, it would be preferred to provide, within the basin, a mixture of the biomasses, if they are compatible. Should the preferred biomasses be incompatible, two basins may be provided within the treatment zone, each containing one type of biomass. In this latter case, the stream treated in the upstream basin, and preferably clarified, would be passed on for treatment in the downstream basin.

Further, should the biomass selected not fully degrade the constituent, it may be advantageous to provide a larger basin or to reduce the flow rates to provide an increased residence time.

In most instances, the biomass will be cultivated from a natural source containing many types of microorganisms, e.g., soil and/or purchased commercially. The biomass-containing material is conditioned by feeding it a material containing the constituents to be removed from the process stream. Microorganisms capable of biodegrading the constituents will survive, while those incapable of biodegrading the constituents will die off. Thus, a biomass culture ideally suitable to degrade the targeted constituent can be developed.

In general, the pH of the aqueous solution in which the biomass is immersed should be such as to promote the vitality of the biomass. The pH of the aqueous solution in which the biomass is immersed is species-dependent. In general, however, the pH of the aqueous solution should be between about 6 and about 8.5. The solution may be buffered by methods known in the art to discourage damage to the biomass by system upsets. A pH electrode may detect the pH of the sample extracted from the aqueous solution (or the clarified liquid) prior to its introduction to the membrane separator. Such an electrode may communicate with the analyzer and controller. Should the analyzer and controller read a pH outside of the desired range, it may send an appropriate signal to a meter capable of injecting into the aqueous solution or into the influent fluid stream an appropriate amount of acid, e.g., hydrochloric acid, or base. e.g. sodium-hydroxide, as the case may be.

In general, the temperature of the aqueous solution in which the biomass is immersed should be such as to promote the vitality of the biomass. The temperature of the aqueous solution is species-dependent. In general, however, the temperature of the aqueous solution should be between about 15° C. and about 40° C. A temperature measuring device, such as a thermocouple, may be placed within the aqueous solution in which the biomass is immersed or within e.g., conduit means 105 of FIG. 1. The temperature measuring device may communicate with the analyzer and controller. Should the controller receive input from the analyzer indicating a temperature outside the desired range, it may send an appropriate signal to a temperature control unit capable of effecting changes in the temperature of the aqueous solution. Suitable temperature control devices include electrical coil heaters, steam panel heaters, and heat transfer fluid jackets.

The textbook *Wastewater Engineering: Treatment, Disposal, Reuse*, 2nd Edition, McGraw-Hill Book Company, New York (1979) at Chapters 9, 10, and 12, herein incorporated by reference, provides information as to the microorganisms present in biodegradation mass, as well as temperature and pH ranges suitable for their maintenance (see pages 398–405).

In the embodiments utilizing gas stripping, it may be preferred to not vent the effluent stripping stream into the environment. In such cases, the effluent stripping stream may be treated, prior to venting, to remove the undesired constituents contained therein, e.g., volatile organics. Such treatment may comprise, e.g., incineration, condensing out the organics, or removing the organics through a membrane extraction. In any case, the non-condensed gas, or the substantially organic-free permeate or non-permeate streams may be recycled back to the gas stripping process as part of the influent gas stripping stream.

The following Example is provided for the purpose of explanation rather than limitation.

EXAMPLE 1

This Example was conducted in a waste water pilot plant consisting of two, seventy-five liter aeration basins, each of the two basins having an associated clarifier. Aeration basin I contained living biomass and was continuously spiked with the constituents of interest, i.e., continuously provided with known solutions of the constituents of interest for the purpose of calibration. Aeration basin II was spiked, but its biomass was rendered inactive by maintaining it at a pH of less than 2.0. Aeration basin II was further drained and refilled following each analysis to prevent a significant growth of biomass that might survive the acidification, and to prevent the accumulation of solids. Each of the two basins was continuously stirred. Each of the basins was operated at a 100 day sludge age. Each of the basins was maintained at a temperature of about 27° Celsius. The biomass in each basin was continuously fed with primary waste water from the Dow general treatment plant in Midland, Mich.

The primary waste water was first filtered by 100 micron and 50 micron canister filters to remove solids, and then flowed through a 40 liter steel reservoir for additional settling of solids. The filtered primary stream was pumped into a glass mixing vessel at a rate of 110 milliliters per minute. The mixing vessel served to mix the spiked solution with the waste water stream flowing to basins I and II. The mixing vessel was fitted with a polytetrafluoroethylene coated silicon rubber seal to prevent losses due to evaporation. The water was stirred in the mixing vessel with a polytetrafluoroethylene coated magnetic stirring bar. Overflow was maintained in the mixing vessel to ensure that no headspace formed.

The filtered and mixed waste water continuously flowed into each basin at a rate of 35 milliliters per minute. Air continuously flowed at 0.9 liters per minute into the bottom of each aeration basin such that dissolved oxygen levels were maintained at or above two parts per million. The tops of each aeration basin and each clarifier were covered with polyethylene sheeting tight enough to reduce the dilution of the effluent gas stripping stream due to air currents in the room, but not so tight as to cause a positive pressure in the basin or clarifier headspace.

Samples of the effluent gas stripping streams, the influent liquid stream, and the clarified effluent liquid streams were transported from aeration basins I and II to five corresponding membrane separators, through twenty feet long, one-eighth inch outer diameter stainless steel tubes. In each case, the mass flow rate of the constituent in the influent gas stripping stream ($M_{IS}$) was not intermittently measured. Rather, $M_{IS}$ was initially measured and entered into the computer as a known data point.

The membrane separators used in this study were constructed by mounting one length of Dow Corning Silastic medical grade tubing into one-eighth inch stainless steel tubing tees, as shown in FIG. 3. For sampling the effluent gas stripping streams, 0.012 inch inner diameter, 0.025 inch outer diameter hollow fiber membranes where used. The effluent gas stripping stream samples were pumped through the membranes at the rate of 60 milliliters per minute with an air pump available from Metal Bellows Corporation (Sharon, Mass.). For the liquid influent stream and the clarified liquid effluent stream, 0.058 inch inner diameter, 0.077 inch outer diameter hollow fiber membranes were used. Samples of the influent liquid and clarified liquid effluent streams were drawn through the membranes at the rate of 10 milliliters per minute with fluid pumps available from Fluid Metering Corporation (Oyster Bay, N.Y.).

The permeate streams were transferred from the membrane separators to a ⅛" SC-12-HT Hastelloy-C rotary switching valve available from Valco Instrument Company, Incorporated (Houston, Texas). The rotary switching valve sequentially introduced the withdrawn samples to a Balzers QMG511 quadrupole mass spectrometer equipped with a gas tight ion source. The rotary and switching valve was computer actuated so that a different stream was sampled every five minutes. Each inlet, when not selected for sampling to the mass spectrometer, was continuously evacuated by a vacuum pump to prevent accumulation of the permeate streams. The membrane separators and rotary switching device were mounted in an oven and maintained at a temperature of 30° Celsius. The mass spectrometer chamber and transfer line between the rotary switching valve and the mass spectrometer were heated to a temperature of 100° Celsius.

Since the constituents of interest were generally nonpolar and relatively insoluble in water, the spike solutions were prepared in acetone to facilitate dissolution in the waste water stream. Each spike solution contained two of the constituents of interest and was spiked into the waste water in the one liter mixing vessel at a rate of about 5 microliters per minute using a 10 milliliter syringe with a syringe pump available from Sage Instruments (Cambridge, Mass.). These constituents, their concentrations in the waste watery and the mass to charge ratios (m/z) of the ions used for quantitation are listed in Table 1.

TABLE I

| Spike Sets with Monitored Ions | | | |
|---|---|---|---|
| SPIKE SOLUTION | | Concentration in Waste Water (mg/L) | m/z |
| 1 | TOLUENE | 2.4 | 91 |

TABLE I-continued

| Spike Sets with Monitored Ions | | | |
|---|---|---|---|
| SPIKE SOLUTION | | Concentration in Waste Water (mg/L) | m/z |
| | METHYLENE CHLORIDE | 3.4 | 84 |
| 2 | BENZENE | 3.7 | 78 |
| | CARBON TETRACHLORIDE | 3.6 | 117 |
| 3 | ETHYLBENZENE | 0.5 | 91 |
| | CHLOROFORM | 2.7 | 83 |
| 4 | STYRENE | 5.4 | 104 |
| | 1,1,2-TRICHLOROETHANE | 5.8 | 97 |
| 5 | CHLOROBENZENE | 4.7 | 112 |
| | PERCHLOROETHYLENE | 3.8 | 129 |
| 6 | BROMOFORM | 3.0 | 81 |
| | 1,1,1-TRICHLOROETHANE | 3.8 | 97 |

The mass balance equation for a given component is as follows:

$$M_{IF} + M_{IS} = M_{EF} + M_{ES} + M_P$$

The percent recovery of that constituent is as follows:

$$\% \text{ recovery} = \frac{M_{EF} + M_{ES}}{M_{IF} + M_{IS}} \times 100\%$$

The corresponding percent biouptake of the constituent is as follows:

$$\% \text{ biouptake} = 100\% - \% \text{ recovery}$$

This assumes the system reached steady state, wherein the mass flow rate of the constituent as solubilized in the aqueous solution in which the biomass is immersed is constant.

The percent recoveries obtained for aeration basin II approached one hundred percent, since no active biomass was present. In contrast, the percent recoveries obtained for aeration basin I were significantly less than one hundred percent for nearly every compound, due to treatment by the biomass.

The percent biouptake for each of the spiked constituent by Basin I is set forth in Table 2. Percents biouptake predicted by the literature are likewise set forth in Table 2 for comparison.

TABLE II

| % Biouptake by Basin I | | |
|---|---|---|
| | EXPERIMENTAL | LITERATURE |
| TOLUENE | 71 ± 2 | 50–95[b], 84–88[d], 40–79[e] |
| METHYLENE CHLORIDE | 85 ± 1 | 96[a], 50–95[b], 100[f] |
| BENZENE | 94 ± 4 | 50–95[b], 85–88[d] |
| CARBON TETRACHLORIDE | 58 ± 1 | 50–95[b] |
| ETHYLBENZENE | 66 ± 33 | 50–95[b], 85–97[d] |
| CHLOROFORM | 37 ± 3 | 50–95[b], 0[e] |
| STYRENE | 99 ± 1 | |
| 1,1,2-TRICHLOROETHANE | 23 ± 7 | |
| CHLOROBENZENE | 90 ± 1 | 91[c], 79–93[e] |

TABLE II-continued

% Biouptake by Basin I

|  | EXPERIMENTAL | LITERATURE |
|---|---|---|
| PERCHLOROETHYLENE | 41 ± 7 | 0[c] |
| BROMOFORM | 20 ± 14 |  |
| 1,1,1-TRICHLOROETHANE | 31 ± 4 | 5[b, 0c] |

[a]Rittman, B. E and McCarty, P. L., "App. and Eviron. Microbiology", 1980, 39(6), 1225–1226.
[b]Eckenfelder Jr., W. W., Patoczka, J., and Watkin, A. T.; "Chem. Eng.", 1985, 60–74.
[c]Bouwer, E. J. and McCarty, P. L.; "Environ. Sci. Technol.", 1982, 16, 836–843.
[d]Kincannon, D. F. and Fazel, A.; 41st Annual Purdue Industrial Waste Conference, Purdue University, west Lafayette, Indiana, 1986.
[e]Kirsch, E. J. and Wukasch, R. F.; Report to Municipal Environmental Research Laboratory, Office of Research and Development, U.S. Environmental Protection Agency, Cincinnati, Ohio, 45268.
[f]Klecka, G. M.; "App. and Environ. Microbiology", 1982, 44, 701.

The percent recovery of each spiked constituent in the effluent gas stripping streams is set forth in the following Table III.

TABLE III

% Recoveries by Gas Stripping

|  | BASIN I | BASIN II |
|---|---|---|
| TOLUENE | 16 ± 1 | 79 ± 5 |
| METHYLENE CHLORIDE | 3 ± 1 | 70 ± 2 |
| BENZENE | 4 ± 3 | 64 ± 2 |
| CARBON TETRACHLORIDE | 40 ± 1 | 61 ± 3 |
| ETHYLBENZENE | 33 ± 33 | 94 ± 20 |
| CHLOROFORM | 52 ± 3 | 75 ± 4 |
| STYRENE | 3 ± 1 | 58 ± 5 |
| 1,1,2-TRICHLOROETHANE | 41 ± 3 | 46 ± 4 |
| CHLOROBENZENE | 2 ± 1 | 79 ± 3 |
| PERCHLOROETHYLENE | 55 ± 7 | 94 ± 4 |
| BROMOFORM | 27 ± 3 | 31 ± 3 |
| 1,1,1-TRICHLOROETHANE | 61 ± 4 | 75 ± 5 |

The scope of the subject invention is to be limited only by the following claims.

We claim:

1. A process for treating a liquid stream comprising:
   (a) introducing into a treatment zone at a first volumetric flow rate a liquid influent stream containing at least one constituent which may be reduced in concentration by a biodegradation treatment, the influent stream being characterized by a first mass flow rate of each of the constituents introduced;
   (b) treating the influent stream in the treatment zone to reduce the concentration of the at least one constituent by biodegrading with an effective biomass;
   (c) discharging from the treatment zone a liquid effluent stream at a second volumetric flow rate, the effluent stream being characterized by a second mass flow rate of each of the constituents or by-products thereof;
   (d) making an on-line determination of the first mass flow rate of at least one constituent and the second mass flow rate of the constituent or a by-product thereof; and
   (e) adjusting at least one of either the first mass flow rate or the second mass flow rate in response to the determination of step (d).

2. The process of claim 1, wherein the influent stream remains in the treatment zone for a residence time prior to the discharging of the effluent stream, and the first mass flow rate is determined at a first time and the second mass flow rate is determined at a second time which is later than the first time by a period approximately equal to the residence time.

3. The process of claim 1, wherein the determination of step (d) comprises:
   (i) separating a first amount of the at least one constituent from the influent stream;
   (ii) separating a second amount of the at least one constituent from the effluent stream;
   (iii) independently providing the first and second amounts to an analytical devices the analytical device being suitable to generate first and second responses useful in the calculation of the first and second mass flow rates; and
   (iv) providing the first and second volumetric flow rates to the analytical device as data points for the calculation;
   (v) calculating the first mass flow rate from the generated first response and the provided first volumetric flow rate, and the second mass flow rate from the generated second response and the provided second volumetric flow rate.

4. The process of claim 3, wherein the separating of step (d) substeps (i) and (ii) comprises contacting at least a portion of the influent stream and at least a portion of the effluent stream with at least one selectively permeable membrane to produce first and second permeates enriched with respect to the constituent or a by-product thereof, the first and second amounts comprising the first and second permeates, respectively.

5. The process of claim 1, wherein the treatment further comprises gas stripping, the influent stream containing a first constituent which may be reduced in concentration by biodegrading with an effective biomass and a second constituent which may be reduced in concentration by gas stripping.

6. The process of claim 5, wherein the biodegrading of the first constituent occurs chronologically prior to the gas stripping of the second constituent.

7. The process of claim 5, wherein the biodegrading of the first constituent occurs chronologically after the gas stripping of the second constituent.

8. The process of claim 5, wherein the biodegrading of the first constituent occurs concurrently with the gas stripping of the second constituent.

9. A process for treating a liquid stream in conjunction with a biodegradation treatment, the process comprising the steps of:
   (a) introducing into a treatment zone at a first volumetric flow rate a liquid influent stream containing at least one constituent which may be reduced in concentration by a gas stripping treatment, the influent stream being characterized by a first mass flow rate of each of the constituents introduced;
   (b) treating the influent stream in the treatment zone to reduce the concentration of the at least one constituent by gas stripping,
   (c) discharging from the treatment zone a liquid effluent stream at a second volumetric flow rate, the effluent stream being characterized by a second mass flow rate of each of the constituents or by-products thereof;
   (d) making an on-line determination of the first mass flow rate of at least one constituent and the second mass flow rate of the constituent or a by-product thereof; and
   (e) adjusting at least one of either the first mass flow rate or the second mass flow rate in response to the determination of step (d).

10. The process of claim 9, wherein the influent stream remains in the treatment zone for a residence time prior to the discharging of the effluent stream, and the first mass flow rate is determined at a first time and the second mass flow rate is determined at a second time which is later than the first time by a period approximately equal to the residence time.

11. The process of claim 9, wherein the determination of step (d) comprises:
 (i) separating a first amount of the at least one constituent from the influent stream;
 (ii) separating a second amount of the at least one constituent from the effluent stream,
 (iii) independently providing the first and second amounts to an analytical device, the analytical device being suitable to generate first and second responses useful in the calculation of the first and second mass flow rates;
 (iv) providing the first and second volumetric flow rates to the analytical device as data points for the calculation; and
 (v) calculating the first mass flow rate from the generated first response and the provided first volumetric flow rate, and the second mass flow rate from the generated second response and the provided second volumetric flow rate.

12. The process of claim 11, wherein the separating of step (d) substeps (i) and (ii) comprises contacting at least a portion of the influent stream and at least a portion of the effluent stream with at least one selectively permeable membrane to produce first and second permeates enriched with respect to the constituent or a by-product thereof, the first and second amounts comprising the first and second permeates, respectively.

* * * * *